United States Patent [19]

Rao

[11] 4,457,000
[45] Jun. 26, 1984

[54] SHOCK WAVE SUPPRESSING FLOW PLATE FOR PULSED LASERS

[75] Inventor: Gadicherla V. R. Rao, Thousand Oaks, Calif.

[73] Assignee: Rockwell International Corporation, El Segundo, Calif.

[21] Appl. No.: 354,321

[22] Filed: Mar. 3, 1982

[51] Int. Cl.³ .................................................. H01S 3/22
[52] U.S. Cl. ........................................ 372/58; 372/89; 372/90
[58] Field of Search ................... 372/58, 55, 89, 81, 372/90; 239/555

[56] References Cited

U.S. PATENT DOCUMENTS 3,876,960  4/1975  De Koker et al. .................. 372/77
3,946,332  4/1976  Samis ................................. 372/58
4,005,374  1/1977  Levatter et al. .................... 372/58
4,235,372  11/1980  Salter ................................ 378/58

*Primary Examiner*—William L. Sikes
*Assistant Examiner*—Léon Scott, Jr.
*Attorney, Agent, or Firm*—H. Fredrick Hamann; Harry B. Field

[57] ABSTRACT

A flow plate positioned upstream of the lasing cavity of an electrically pulsed gas laser blocks the transmission of shock waves generated in the laser cavity. The flow plate has a plurality of passages which are shaped to form a supersonic nozzle at the upstream end of the passage, a subsonic diffuser at the downstream end of the passage and a supersonic diffuser in the central region of the passage.

8 Claims, 3 Drawing Figures

SHOCK WAVE SUPPRESSING FLOW PLATE FOR PULSED LASERS

FIELD OF THE INVENTION

This invention relates to pulsed lasers which use a gas as the lasing medium, and more particularly, is concerned with a flow plate for blocking transmission of shock waves through the gas stream.

BACKGROUND OF THE INVENTION

Gas lasers in which lasing action of the gas molecules is induced by pulsed electromagnetic field are well-known. High energy gas lasers are designed to circulate a gas, such as helium, neon, argon, or krypton continuously through a lasing chamber or cavity at subsonic velocities. Lasing action is produced in the cavity by applying a pulsed electromagnetic field across the cavity in a direction perpendicular to the axis of flow of the gas. Excitation of the gas molecules produces electromagnetic radiation at frequencies characteristic of the particular gas being used. Mirrors on either side of the cavity direct the radiation out of the cavity along an axis mutually perpendicular to the axis of the gas flow and the axis of the electric field.

To provide a uniform wave front of the light emitted from the cavity, it is necessary that the gas density be as uniform as possible throughout the lasing cavity. However, when the cavity is pulsed to induce lasing action in the gas, shock waves are generated which are transmitted through the gas. These shock waves tend to disturb the uniform distribution of gas molecules in the gas upstream of the laser cavity. While baffle systems have heretofore been used to absorb energy from the shock waves, a certain amount of time is required for the gas flow to return to a uniform density within the laser cavity before the electromagnetic field is again pulsed, thus substantially limiting the frequency with which the laser can be pulsed.

SUMMARY OF THE INVENTION

The present invention is directed to a flow plate arrangement through which gas is passed before entering the laser cavity, the flow plate choking off all transmission of shock waves upstream of the flow plate. The flow plate is designed to produce a minimal amount of pressure drop and to maintain flow uniformity through the cavity.

This is accomplished, in brief, by providing a flow plate between a plenum chamber and the laser cavity having an array of fluid flow passages through the plate for directing gas from the plenum chamber into the cavity. Each of the passages through the flow plate includes a supersonic nozzle at the upstream end of the passage, a supersonic diffuser section and a diverging subsonic diffuser section opening into the cavity at the downstream end of the passage. The choked throat of the supersonic nozzle section blocks any disturbances from a shock wave from traveling upstream of the flow plate. The subsonic diffuser allows the gas to enter the cavity at subsonic velocities and with substantially uniform flow.

DESCRIPTION OF THE DRAWINGS

For a more complete understanding of the invention, reference should be made to the accompanying drawings, wherein.

DETAILED DESCRIPTION

Figure 1:
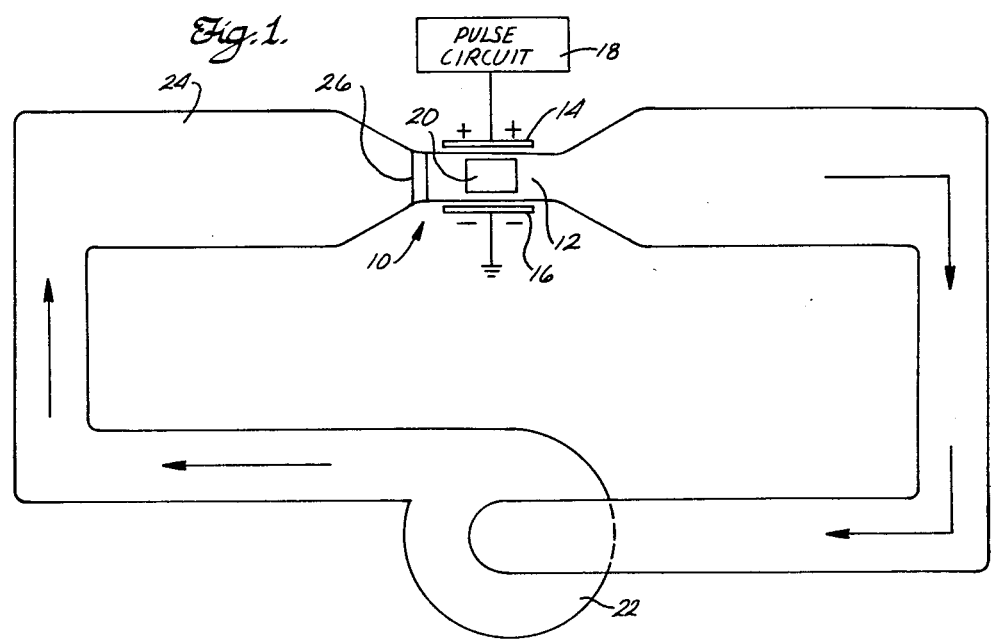
FIG. 1 is a schematic representation of a gas laser.

Referring to FIG. 1 in detail, the numeral 10 indicates generally a gas laser which includes a laser cavity 12 through which a suitable gas is directed. The gas in the cavity 12 is subjected to a high energy pulsed electromagnetic field by a pair of electrodes 14 and 16. A pulsed voltage is applied across the electrode plates 14 and 16 by a suitable pulsing circuit 18. Radiant energy produced by lasing action in the gas is directed in a beam along an axis perpendicular to the plane of the paper by a pair of spaced mirrors, one of which is indicated at 20. Such gas lasers are well-known in the art.

Normally the gas is circulated through the laser cavity by suitable pumping means, such as a centrifugal fan 22, which exhausts gas from the downstream side of the laser cavity 12 and returns it to a plenum chamber 24 positioned upstream of the cavity 12. As pointed out above, the frequency at which the gas laser can be pulsed is limited by the fact that shock waves emanating from the laser cavity produce disturbances in the gas which affect the uniformity of gas density within the cavity. Sufficient time must be allowed between pulses to permit the effect of such disturbances to be scavenged by the continuous flow of gas through the cavity.

Figure 2:
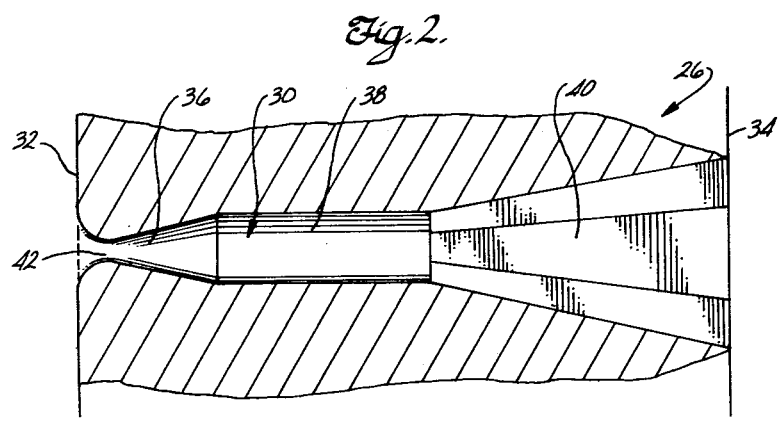
FIG. 2 is a partial cross-sectional view of a flow plate.
Figure 3:
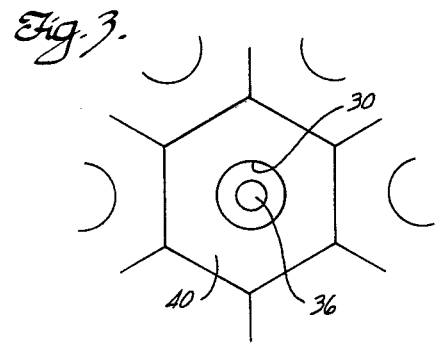
FIG. 3 is a partial end view of a flow plate.

According to the present invention, this time between pulses can be substantially reduced by the introduction of a flow plate 26 at the upstream end of the laser cavity 12, between the laser cavity and the plenum chamber. The preferred design of the flow plate is shown in detail in FIGS. 2 and 3. The flow plate is provided with a plurality of passages, indicated generally at 30, which extend between the two surfaces 32 and 34, forming the front and back of the flow plate. Each passage has three distinct sections or portions, namely, a supersonic nozzle section 36, a supersonic diffuser section 38 and a diverging subsonic diffuser section 40. The supersonic nozzle section includes a choked throat. The supersonic diffuser section 38 is of substantially uniform diameter cross-section. The subsonic diffuser section 40 diverges to a substantially hexagonal opening in the plane of the surface 34. As shown in the end view of FIG. 3, the hexagonal end openings of the passages are contiguous, forming a honeycomb pattern in the plane of the surface 34. This arrangement permits minimum spacing between the passages.

The supersonic nozzle section expands the flow velocity of sufficiently high mach number before reverting to subsonic flow in the subsonic diffuser section 40. It has been found that with a downstream pressure that is as high as 0.8 times the plenum pressure, the flow plate chokes off any upstream transmission of disturbances beyond the choked throat into the plenum chamber. At the same time the flow plate provides very good flow uniformity in the gas released into the laser cavity. Thus the time to eliminate any disturbances produced by shock waves generated in the cavity is limited to the time it takes for the gas to move from the flow plate into the laser cavity. This is in contrast to a simple orifice plate, for example, which requires a rather large pressure drop across the orifice to choke off any upstream transmission of disturbances and must be located considerably upstream to achieve flow uniformity in the the laser cavity region.

While the invention has been described in connection with an electrically pulsed laser, the flow plate may also be used in other types of lasers, such as chemical lasers, in which lasing action is produced in a gas by energy released through chemical reactions.

It is to be understood that what has been described is merely illustrative of the principles of the invention and that numerous arrangements in accordance with this invention may be devised by one skilled in the art without departing from the spirit and scope thereof.

What is claimed is:

1. In a gas laser of the type having a laser cavity through which a gas is passed, the gas being subjected to a pulsed electric field in the cavity for exciting the gas molecules, the improvement comprising: apparatus for blocking shock waves from disturbing the gas upstream of the cavity comprising:
a flow plate having a plurality of passages therethrough for directing gas from a plenum chamber into the laser cavity, each of the passages being shaped to provide a throat portion, a supersonic nozzle portion, a supersonic diffuser portion and a subsonic diffuser portion.

2. Apparatus of claim 1 wherein the flow plate has parallel front and back surfaces, the front surface having a plurality of openings forming the throat portion of said passages.

3. Apparatus of claim 2 wherein the back surface has a plurality of openings that are substantially larger in cross-sectional area than the openings in the front surface.

4. Apparatus of claim 3 wherein the openings in the front surfaces are circular and the openings in the back surface are hexagonal.

5. Apparatus of claim 4 wherein said hexagonal openings are contiguous to each other to reduce the surface area of the back surface between the hexagonal openings to substantially zero.

6. Apparatus of claim 1 wherein the pressure of the gas in the cavity is approximately 0.8 times the pressure in the plenum chamber.

7. A gas laser comprising:
means forming a resonant lasing cavity, means continuously passing a gas through the cavity at a subsonic velocity, means pulsing the cavity with an electric field to excite the gas to produce lasing in the cavity, energy abstracting means and a flow plate positioned adjacent the cavity having a plurality of supersonic nozzles in the flow plate through which the gas flows into the cavity, each supersonic nozzle having a throat position and a diverging portion, the diverging portion opening into a subsonic diffuser portion for reducing the velocity of the gas to subsonic levels in the cavity.

8. Apparatus of claim 7 wherein the supersonic nozzles include a supersonic diffuser portion of substantially uniform cross-sectional area along the length of said nozzles, the supersonic diffuser portion extending between the diverging portion of the supersonic nozzle and the subsonic diffuser portion.

* * * * *